(12) United States Patent
Thorne et al.

(10) Patent No.: US 10,961,021 B2
(45) Date of Patent: Mar. 30, 2021

(54) CLOSURE WITH FOAMED REGION AND METHODS OF FORMING SAID CLOSURE

(71) Applicant: OBRIST CLOSURES SWITZERLAND GMBH, Reinach (CH)

(72) Inventors: Nicholas Thorne, Seyssins (FR); Bruno Nabeth, Nice (FR); Sylvain Verite, Le Mans (FR)

(73) Assignee: Obrist Closures Switzerland GMBH

( * ) Notice: Subject to any disclaimer, the term of this patent is extended or adjusted under 35 U.S.C. 154(b) by 117 days.

(21) Appl. No.: 16/095,131

(22) PCT Filed: Apr. 20, 2017

(86) PCT No.: PCT/EP2017/059445
§ 371 (c)(1),
(2) Date: Oct. 19, 2018

(87) PCT Pub. No.: WO2017/182591
PCT Pub. Date: Oct. 26, 2017

(65) Prior Publication Data
US 2019/0144168 A1    May 16, 2019

(30) Foreign Application Priority Data
Apr. 20, 2016    (GB) ..................... 1606842

(51) Int. Cl.
*B65D 41/04*    (2006.01)
*B29C 44/58*    (2006.01)
(Continued)

(52) U.S. Cl.
CPC ........ *B65D 41/0407* (2013.01); *B29C 44/027* (2013.01); *B29C 44/06* (2013.01);
(Continued)

(58) Field of Classification Search
CPC ............ B65D 41/0407; B65D 41/0435; B65D 47/08; B29C 44/027; B29C 44/06;
(Continued)

(56) References Cited

U.S. PATENT DOCUMENTS 3,286,867 A * 11/1966 Mumford ........... B65D 41/0442
215/321
4,721,221 A * 1/1988 Barriac .............. B65D 41/3466
215/350
(Continued)

FOREIGN PATENT DOCUMENTS

CA    2817980    11/2014
GB    1570637    7/1980
(Continued)

OTHER PUBLICATIONS

Glarraga, Serrano, Written Opinion of Int'l Search Authority (PCT/EP2017/059445 dated Jun. 9, 2017.
(Continued)

*Primary Examiner* — James N Smalley
(74) *Attorney, Agent, or Firm* — Greg Peterson; Maynard Cooper & Gale

(57) ABSTRACT

A closure (750) is provided and comprises a top plate (755) and a sidewall (760) depending from the periphery of the top plate. The closure includes a sealing member (765) which
(Continued)

depends from the top plate within the sidewall. The top plate includes a foamed region which is restricted to being within a boundary defined by the sealing member; the sealing member being substantially unfoamed.

18 Claims, 14 Drawing Sheets

(51) Int. Cl.
  *B65D 47/08* (2006.01)
  *B29C 44/02* (2006.01)
  *B29C 44/06* (2006.01)
  *B29C 45/00* (2006.01)
  *B29C 45/16* (2006.01)
  *B29K 105/00* (2006.01)
  *B29L 31/56* (2006.01)
  *B29K 23/00* (2006.01)
  *B29K 105/04* (2006.01)

(52) U.S. Cl.
  CPC ........ *B29C 44/586* (2013.01); *B29C 45/0001* (2013.01); *B29C 45/1679* (2013.01); *B65D 41/0435* (2013.01); *B65D 47/08* (2013.01); *B29K 2023/06* (2013.01); *B29K 2023/12* (2013.01); *B29K 2105/0005* (2013.01); *B29K 2105/04* (2013.01); *B29K 2995/0063* (2013.01); *B29K 2995/0097* (2013.01); *B29L 2031/56* (2013.01); *B29L 2031/565* (2013.01)

(58) Field of Classification Search
  CPC ............ B29C 45/0001; B29C 45/1679; B29C 44/586; B29L 2031/56; B29L 2031/565; B29K 2023/06; B29K 2023/12; B29K 2105/04; B29K 2995/0063; B29K 2995/0097; B29K 2105/0005
  See application file for complete search history.

(56) References Cited

U.S. PATENT DOCUMENTS

| | | | | |
|---|---|---|---|---|
| 4,744,478 A | * | 5/1988 | Hahn | B65D 41/0407 215/252 |
| 4,879,138 A | * | 11/1989 | Johnson | B65D 41/0407 428/218 |
| 5,769,255 A | * | 6/1998 | Ohmi | B29C 70/80 215/345 |
| 6,358,446 B1 | | 3/2002 | Clarke | |
| 6,401,957 B1 | | 6/2002 | Przytulla | |
| 6,477,823 B1 | * | 11/2002 | Kitterman | B65B 7/168 215/344 |
| 6,488,165 B1 | * | 12/2002 | Hidding | B65D 41/48 215/256 |
| 6,688,795 B1 | | 2/2004 | Jacob | |
| 2004/0055922 A1 | | 3/2004 | Ordonez | |
| 2004/0155007 A1 | * | 8/2004 | Hearld | B65D 41/045 215/343 |
| 2005/0173370 A1 | * | 8/2005 | Odet | B65D 41/0414 215/347 |
| 2006/0016777 A1 | * | 1/2006 | Hidding | B67D 3/0032 215/350 |
| 2008/0179273 A1 | * | 7/2008 | Hidding | B67D 3/0032 215/216 |

FOREIGN PATENT DOCUMENTS

| | | |
|---|---|---|
| GB | 2251430 | 8/1992 |
| WO | 2015128303 | 9/2015 |

OTHER PUBLICATIONS

Cornfield, Joe, United Kingdom Search Report (GB1606842.1); dated Aug. 4, 2016.

* cited by examiner

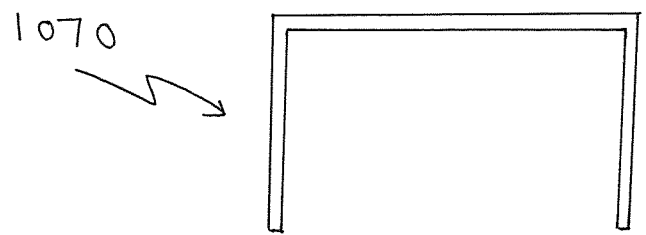
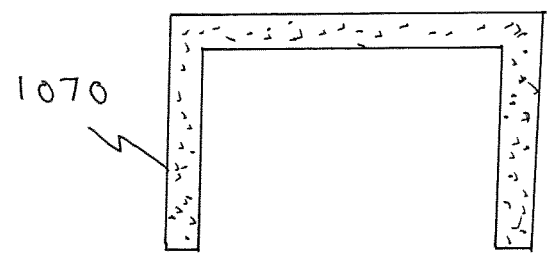
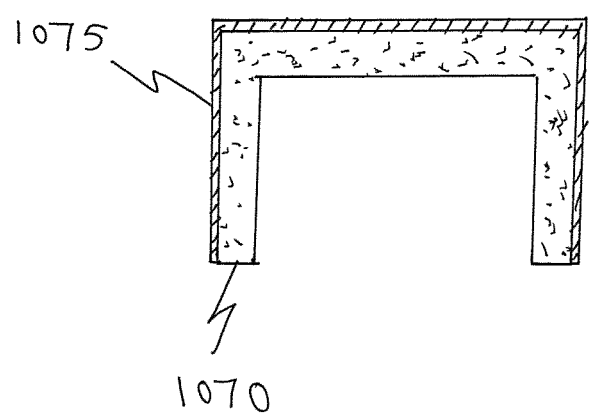
Figure 17

CLOSURE WITH FOAMED REGION AND METHODS OF FORMING SAID CLOSURE

CROSS-REFERENCE TO RELATED APPLICATIONS

This application is a national stage under 35 U.S.C. 371 of International Application No. PCT/EP2017/059445, filed Apr. 20, 2017 (currently published). International Application No. PCT/EP2017/059445 cites the priority of Application No. GB 1606842.1, filed Apr. 20, 2016 (expired).

The present invention relates to a cap, closure, top or the like for a bottle intended to contain, for example, a fluid. It also relates to a process for manufacturing a cap or the like.

Plastic caps are conventionally manufactured from plastic materials that are converted in a thermoplastic injection moulding process that consists in melting the material in a regulated screw/barrel assembly and in pushing the material into a multi-cavity mould in order to enable the material to be formed and cooled.

Operators in this field are confronted with the costs of the plastic materials used which increase proportionally with the cost of hydrocarbons.

According to an aspect of the present invention there is provided a closure comprising a top plate and a sidewall depending from the periphery of the top plate, the closure including a sealing member which depends from the top plate within the sidewall, in which the top plate includes a foamed region which is restricted to being within a boundary defined by the sealing member, the sealing member being substantially unfoamed.

The sealing member may be formed integrally with the top plate. The sealing member may be, for example, a crab claw type seal or a plug seal.

Alternatively or additionally the sealing member may be formed separately from, and be attachable to, or located adjacent, the top plate.

Selective foaming via mould movements could be used in order to remain "inside" (i.e. between) the seal feature/s. This makes it possible to maintain dimensional repeatability and functional sealing performance. For example the sealing feature may be generally annular and the foamed region is restricted to being radially inwards of the feature.

The extremity of the foamed region is spaced from the sealing member by between 0.5 and 5 mm, for example between 1 mm and 2 mm. In other words foaming is induced inside the seal features and between 0.5 and 5 mm of gap is left to ensure seal performance is not altered or modified.

The present invention also provides a closure comprising a top plate and a sidewall, the closure including a sealing liner which depends from the top plate, in which at least part of the top plate includes a foamed region.

The liner may be generally disc-shaped or otherwise shaped so as to substantially cover the underside of the top plate.

The sidewall may comprise a screw thread formation. The screw thread formation extends radially inwards and the foamed plastics material may not extend beyond a boundary defined by the radial extent of the formation.

The foamed region may comprise a first layer formed of unfoamed plastics material, a second layer of foamed plastics material and a third layer of unfoamed plastics material, the second layer being positioned between the first layer and the third layer. Therefore a trilaminar structure is provided, with a central core and an outer layers either side of the core.

The second layer may be positioned approximately centrally with respect to the first and third layers.

The present invention also provides a wide mouth container lid comprising a closure as described herein.

The present invention also provides a jar lid comprising a closure as described herein.

The present invention also provides a flip top dispensing closure comprising a base and a lid connected by an integral hinge, the base comprising a top plate and a sidewall depending from the periphery of the top plate, the closure including a sealing member which depends from the top plate within the sidewall, in which the top plate includes a foamed region which is restricted to being within the sealing member whereby the sealing member is substantially unfoamed.

The lid may comprise a top plate with a depending sidewall and at least part of the lid has a foamed region.

The hinge may be formed from unfoamed plastics material.

In some embodiments the hinge portion consists of the unfoamed plastic material so that it has sufficient mechanical fatigue strength (or hinge endurance) properties in order to be stressed and folded several times without breaking during the opening and closure of the orifice.

In some aspects and embodiments the sidewall comprises a screw thread formation (for example a single or a multi-start thread).

The present invention also provides a closure comprising a top plate and a sidewall, the closure comprising a separate liner for providing a seal in use, the liner being secured or securable to the top plate and defining a non-sealing region of the top plate within the liner, in which at least part of the non-sealing region includes a foamed region.

At least part of the sidewall may have a foamed region.

The present invention also provides a closure comprising a top plate and a sidewall depending from the periphery of the top plate, in which at least part of the sidewall is formed from foamed plastics material.

At least part of the top plate may be formed from foamed plastics material.

The sidewall may comprise a screw thread formation.

Conventionally, in closures with a side skirt that has a screw thread formation the skirt is actually quite thick due to the fact that sufficient material must be used to limit the creation of "sink marks" on the outer surface of the skirt.

In some embodiments the foaming agent is present throughout the formulation i.e. in parts of the closure which will be subject to mould movement expansion and parts which will not. The present inventors have realised that it is possible to rely on the fact that the foaming agent makes it possible to compensate the sink marks in the skirt. Accordingly it is possible to make these parts of the closure thinner than normal whilst not suffering the problem of sink marks.

In one aspect of the present invention therefore, a closure is formed with a foamed core top plate and a reduced thickness sidewall.

Hence the foaming agent, added as a master batch, has two effects:
  significant foaming in the top plate thanks to the core back leaving a controlled amount of space for foaming to occur
  "swelling" in the skirt region that automatically compensates shrinkage.

The present invention also provides a moulded closure formed from a foamable plastics material, the closure comprising a top plate and a sidewall, the plastics material forming part of the top plate being intentionally unfoamed and having an apparent density of R, the rest of the material forming the top plate being intentionally foamed and having an apparent density in the range of 0.2-0.9 R, for example in the range 0.4 R to 0.8 R, the sidewall including a screw thread formation, the material forming the sidewall at least in the region of the formation having an apparent density in the range 0.8-0.99*R whereby shrinkage has been compensated by natural foaming.

For example, for PP, R will be equal to 0.9 and for HDPE, R will be between 0.93 and 0.96.

Sink marks in injection moulded plastic closures can develop when material in the region of screw threads shrinks more than the material in the adjacent wall. The presence of the screw threads creates an effectively thicker region that cools more slowly than neighbouring regions. Differential rates of cooling result in a depression on the adjacent surface that is known as a sink mark.

Currently the maximum depth of a thread formation is up around 80% of the sidewall thickness if sink marks are to be avoided.

In embodiments of the present invention in which the sidewall comprises a screw thread formation the depth of the formation may be more than 80% of the depth of the sidewall. The use of a foamable plastics material means that depressions in the sidewall are compensated for by natural expansion of the foamable plastics material.

In some embodiments the formation depth may be up to 120% of the depth of the sidewall.

The present invention also provides a method of forming a closure as described herein, comprising the steps of: providing an injection mould with a fixed part and a mobile part; positioning the mould parts to define a first gap; injecting a foamable plastics material formulation to fill the first gap; and moving the mobile part to define a second gap so that the formulation expands to fill the second gap.

The ratio between the second gap and the first gap may be between 1.1 and 1.8. It is thus possible to obtain an average expansion ratio of the plastic material of the order of 10% to 80%.

The ratio between the second gap and the first gap may be between 1.3 and 1.7. The expansion ratio that can be achieved is then between 30% and 70%.

The method may further comprise an in-mould labelling step.

The present invention also provides a method of forming a moulded plastics closure, comprising the steps of
providing a mould
injection moulding a foamable plastics material to form a generally cup-shape closure body having a top plate and a side wall using an inside injection point; and
moving part of the mould which external to the body to cause foaming of part of the body.

The top plate may be formed so as to include a depending sealing member. The sealing member may extend generally perpendicular to the parting line of the mould.

The method may further comprise the step of loading a label into the mould prior to injection moulding the body whereby to facilitate in-mould labelling of the body.

The present invention also provides a method of forming a moulded plastics closure, comprising the steps do:
providing a mould;
injection moulding a foamable plastics material to form a generally cup-shape closure body having a top plate and a side wall using an inside injection point; and
moving part of the mould which external to the body to cause foaming of part of the body.

The present invention also provides a method of forming a moulded plastics closure, comprising the steps of:
forming a first part by injection moulding a foamable plastics material;
causing at least part of the first part to foam; and
sequentially moulding a second part onto and/or into the first part.

In some aspects and embodiments the present invention aims to reduce the costs by proposing a cap for a bottle intended to contain a fluid, the cap comprising at least a sealing portion (or top plate) and a lateral portion (or sidewall) intended to be fastened to the bottle, the sealing portion comprising along a direction substantially perpendicular to the lateral portion a first layer formed of unfoamed plastic material, a second layer formed of foamed plastic material and a third layer formed of unfoamed plastic material, the second layer being positioned between the first layer and the third layer.

Thus, the presence of the second layer made of foamed plastic material makes it possible to achieve a sufficient cap thickness to ensure that the necessary stiffness is obtained, while limiting the amount of raw materials used. A reduction in the weight of the caps then enables the reduction of the costs while retaining the functional, physical and chemical properties of the caps.

The expression "foamable plastics material" is understood in the present document to mean plastics material which is capable of foaming, either naturally or deliberately (for example by movement of a mould part).

The expression "foamed region" is understood in the present document to mean an area of a closure wall (such as a top plate or a sidewall) which has been caused to foam deliberately i.e. by a specific step in a moulding process, such as movement of a mould part.

The expression "unfoamed plastics material" is understood in the present document to mean a solid plastic material corresponding to "unfoamed plastic material" or "plain material" (density R).

The expression "foamed material" means material which has been caused to expand by movement of a mould part and a pressure released while the material is locally still molten (density between 0.2 R and 0.9 R).

The expression "expanded material" means material which expands into a mould cavity without movement of the mould i.e. naturally "swelling" to fill a gap and naturally taking up any shrinkage (density between 0.9 R and 0.99 R).

Closures formed in accordance with the present invention can have one or more regions of unfoamed material (intentionally unfoamed); expanded material (naturally foamed); and foamed material (intentionally foamed). Intentionally foamed regions will normally be formed from foamed as well as unfoamed material (e.g. a foamed core with unfoamed skins either side).

In the "thickness" of a foamed wall (e.g. top plate or side wall) may be a succession of skin—foamed core—skin.

Closures formed in accordance with the present invention may be obtained from a formulation comprising at least one polyolefin, for example polypropylene or polyethylene.

Closures formed in accordance with the present invention may be obtained from a formulation comprising at least one propylene-based polyolefin and at least one foaming agent in a proportion of active components of between 0.3% and 2.5% by weight introduced with a carrier.

This formulation leads to good foaming under the conditions of manufacture by thermal injection moulding via the use of a masterbatch which includes at least one foaming agent in dilute form in a matrix compatible with the resin converted. The homogenization and thermal activation of the foaming agent take place in a screw/barrel assembly.

When the cap is intended for applications in the food, pharmaceutical or paramedical field, the foaming agent is advantageously selected from endothermic agents such as citric acid, sodium bicarbonate or a mixture of these agents. In a preferred embodiment a mixture of citric acid and sodium bicarbonate is selected. The endothermic agent or mixture of endothermic agents is used in order to adjust the cell size.

In aspects and embodiments of the present invention the closure may be formed from plastics material having a melt flow index in the range of 20 to 50 g/10 min.

Preferably, the formulation comprises a melt flow index of between 20 and 50 g/10 min so that the sealing portion has an impact strength of 3.5 to 10 kJ/m2 in a notched Izod impact test at 23° C. These values are obtained according to the ISO 179/1 eA standard. Furthermore, such a melt flow index enables the formulation to be injected at relatively low temperatures, of the order of 200-210° C. This reduces the time needed for the cooling of the cap, which corresponds to the longest length of time in the process, so that the cycle time is substantially reduced.

The material of foamed portions may comprise an expansion ratio of between 30% and 70%. This makes it possible to achieve sufficient flexural stiffness despite a reduced amount of material by increasing inertia.

The top plate may have a thickness of between 1.3 and 1.7 mm so as to have an apparent flexural modulus of 800 to 1500 MPa. Indeed, this thickness of the top plate is critical considering the expansion ratio. If the thickness was smaller, the top plate could display failures in terms of mechanical stiffness so that the cap would not be able to be suitable for all uses.

According to one arrangement, the formulation used to manufacture closures in accordance with the present invention comprises a nucleating agent, such as nucleating talc, sodium benzoate (NaBz such as sodium 2,2'-methylenebis (4,6-di-tert-butylphenyl)phosphate from Asahi Denka Kogyo K. K., known commercially under the name NA-11®), a phosphate ester salt or a calcium metal salt (Hyperform® HPN-20E) in a proportion of between 300 and 1500 ppm.

The formulation may comprise a clarifying agent, such as a derivative of sorbitol (1,3:2,4-dibenzylidene sorbitol—DBS—Irgaclear D from CIBA or Millad 3905 from Milliken, 1,3;2,4-di-p-methyldibenzylidene sorbitol MDBS—Irgaclear DM from CIBA or Millad 3940 from Milliken, 1,3:2,4-di-m,p-methylbenzylidene sorbitol DMDBS, Millad 3988 from Milliken) in a proportion of between 500 and 2000 ppm or a derivative of nonitol (1,2,3-trideoxy-4,6:5,7-bis-O-[(4-propylphenyl)methylene]nonitol) in a proportion of between 3000 and 5000 ppm.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims.

The present invention will now be more particularly described, by way of example, with reference to the accompanying drawings.

The example embodiments are described in sufficient detail to enable those of ordinary skill in the art to embody and implement the systems and processes herein described.

It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples.

There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In the following description, all orientational terms, such as upper, lower, radially and axially, are used in relation to the drawings and should not be interpreted as limiting on the invention.

FIG. 17 illustrates a method according to an aspect of the present invention.

KEY

Unfoamed Material (i.e. Intentionally Unfoamed)

Expanded Material (i.e. Naturally Foamed)

Foamed Material (i.e. Intentionally Foamed)

Figure 1:
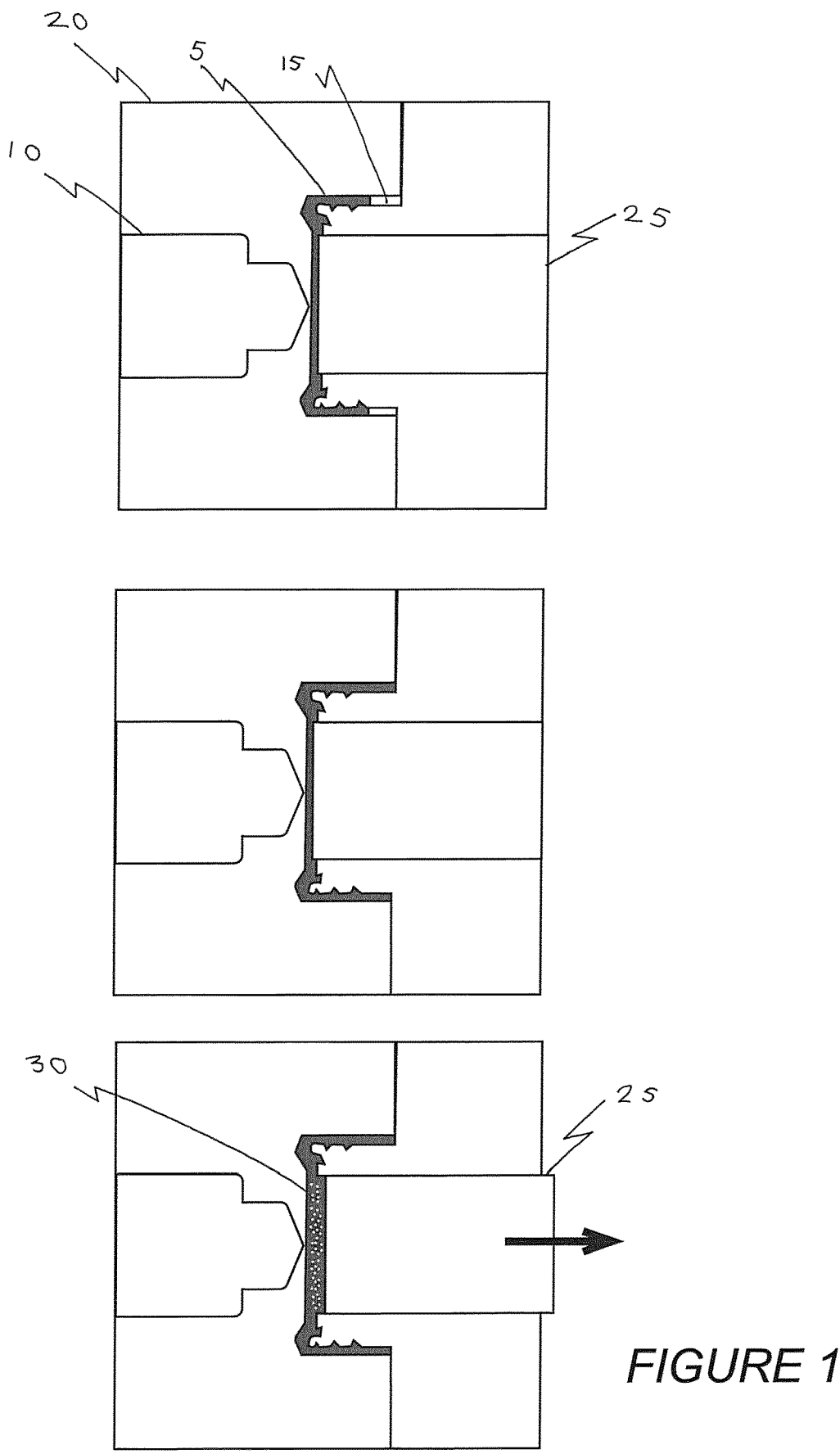
FIG. 1 shows a core back moulding process used to form closures in accordance with embodiments of the present invention.

In FIG. 1a "core back" moulding process suitable for use as part of the present invention is shown.

In a first step molten (foamable) plastics material 5 is injected through a nozzle 10 into a cavity 15 formed by a fixed mould part 20 and a moving mould part 25.

In a second step the cavity fill is complete and a short holding phase is provided, during which time the outer skins of the plastics material cool and begin to solidify.

In a third step the moving mould part 25 is moved and the pressure drop causes foaming of the material in the enlarged cavity. As a result the material between the outer skins of the top plate 30 of the moulded closure foams.

Figure 2:
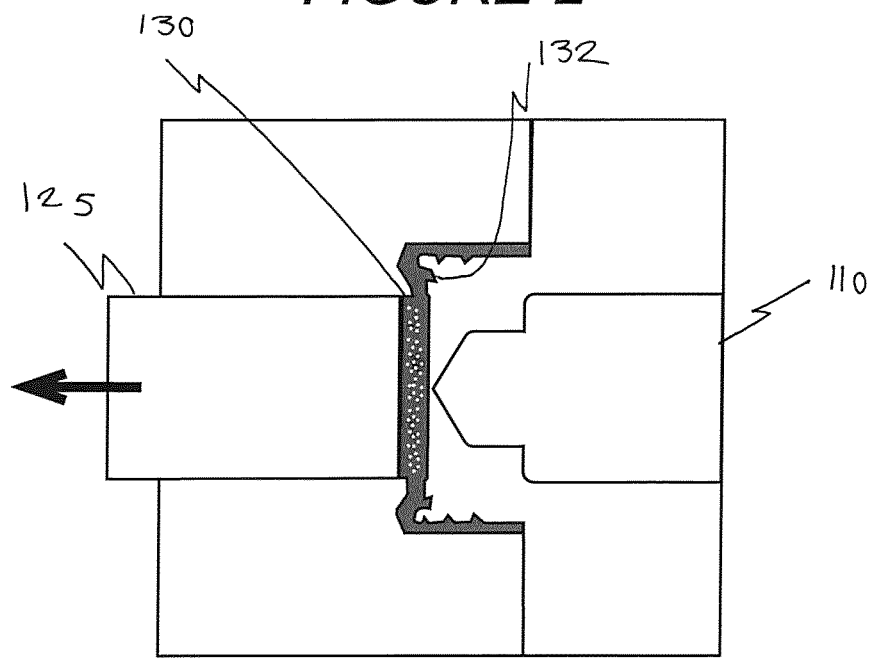
FIG. 2 shows an alternative core back moulding process using an inside injection point and an external movable mould part.

In FIG. 2 a similar core back foaming process is shown, except that in this embodiment the injection nozzle 110 is "inside" the mould cavity. This means that the mobile mould part 125 can be positioned on the other side of the closure top plate 130.

Figure 3:
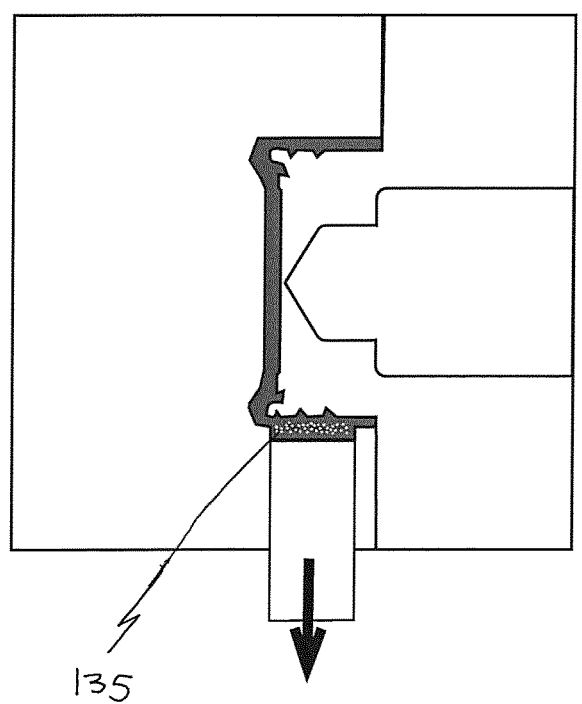
FIG. 3 shows an alternative moulding process with an inside injection point and a movable side core.

FIG. 3 is similar to FIG. 2, with an inside injection point. In this embodiment the core back movement is at the outside face of one side of the sidewall 235.

Figure 4:
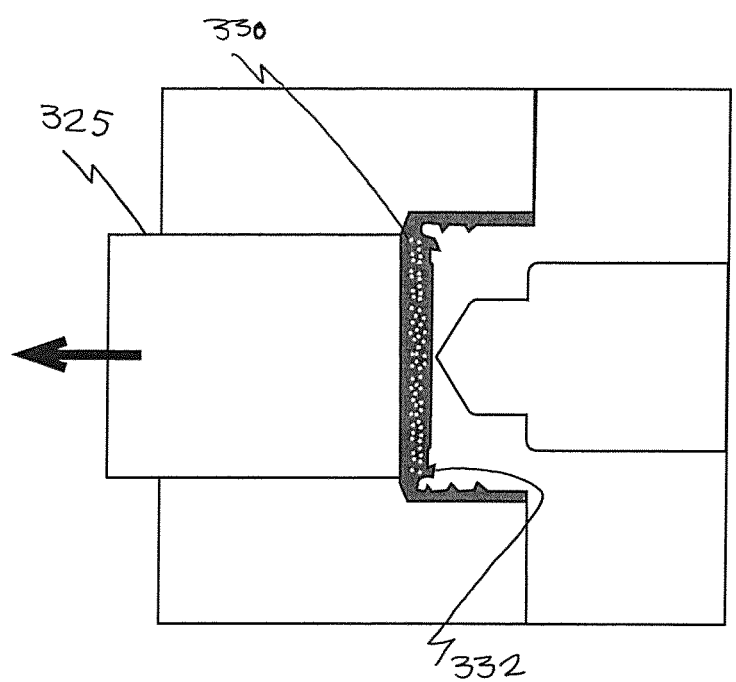
FIG. 4 shows a further moulding process with an inside injection point and an external movable mould part.

FIG. 4 is also similar to FIG. 2, with an exterior core back movement "above" the top plate 330. In FIGS. 2 and 4 the top plates 130, 330 include a depending annular seal 132, 332. In FIG. 2 the movable mould part is positioned so that the cavity gap is formed radially inwards of the seal 132. However, the present inventors have realised that it is possible to cause foaming of the top plate "above" the seal without causing foaming in the seal itself because the seal is perpendicular to the mould parting line (so they will maintain their dimensional integrity). Accordingly, in FIG. 4 the movable mould part 325 is an outside part and extends wider than the seal. With an inside injection point and an outside core back function this means that a larger area can be foamed than with an inside injection/inside movement system and consequentially a larger area can be foamed.

Figure 5:
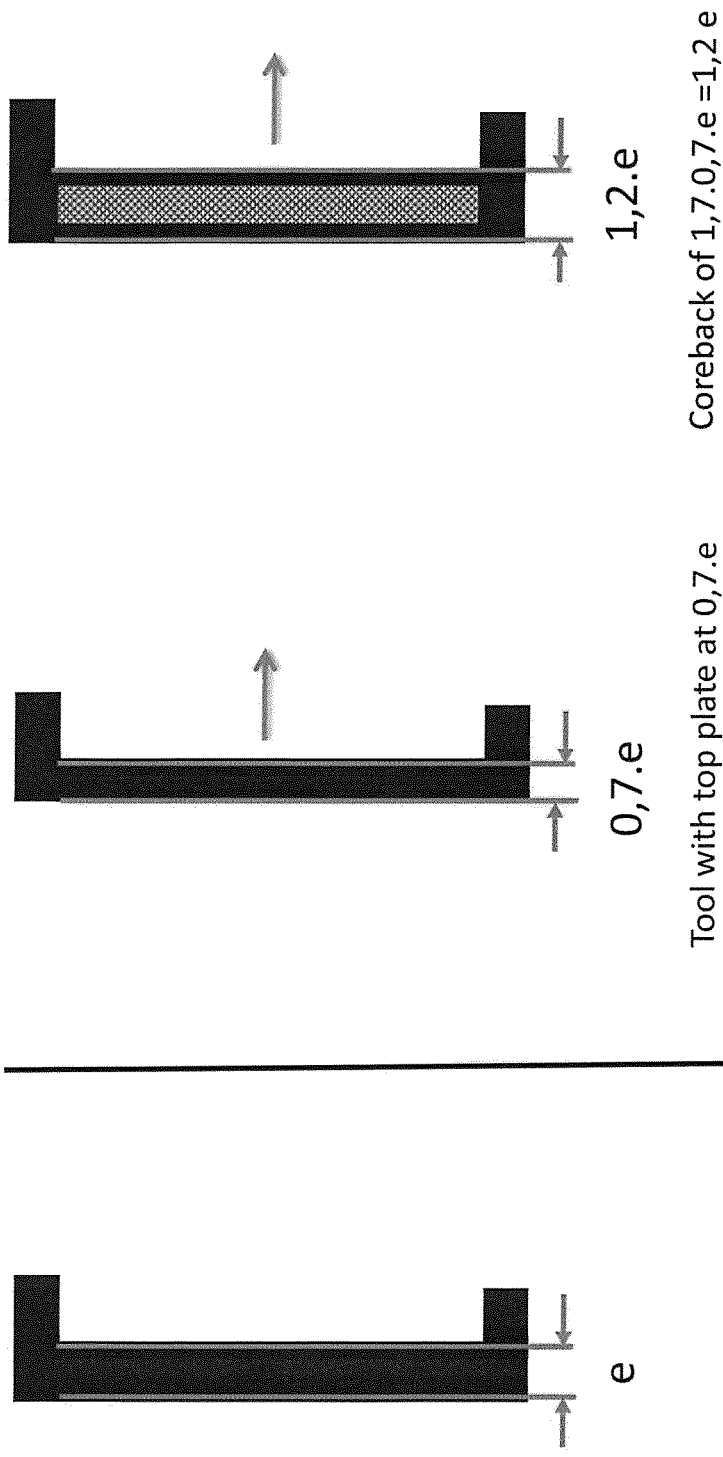
FIG. 5 illustrates an example of the difference between a standard cap and a cap formed using a core back moulding and foaming process.
Figure 6:
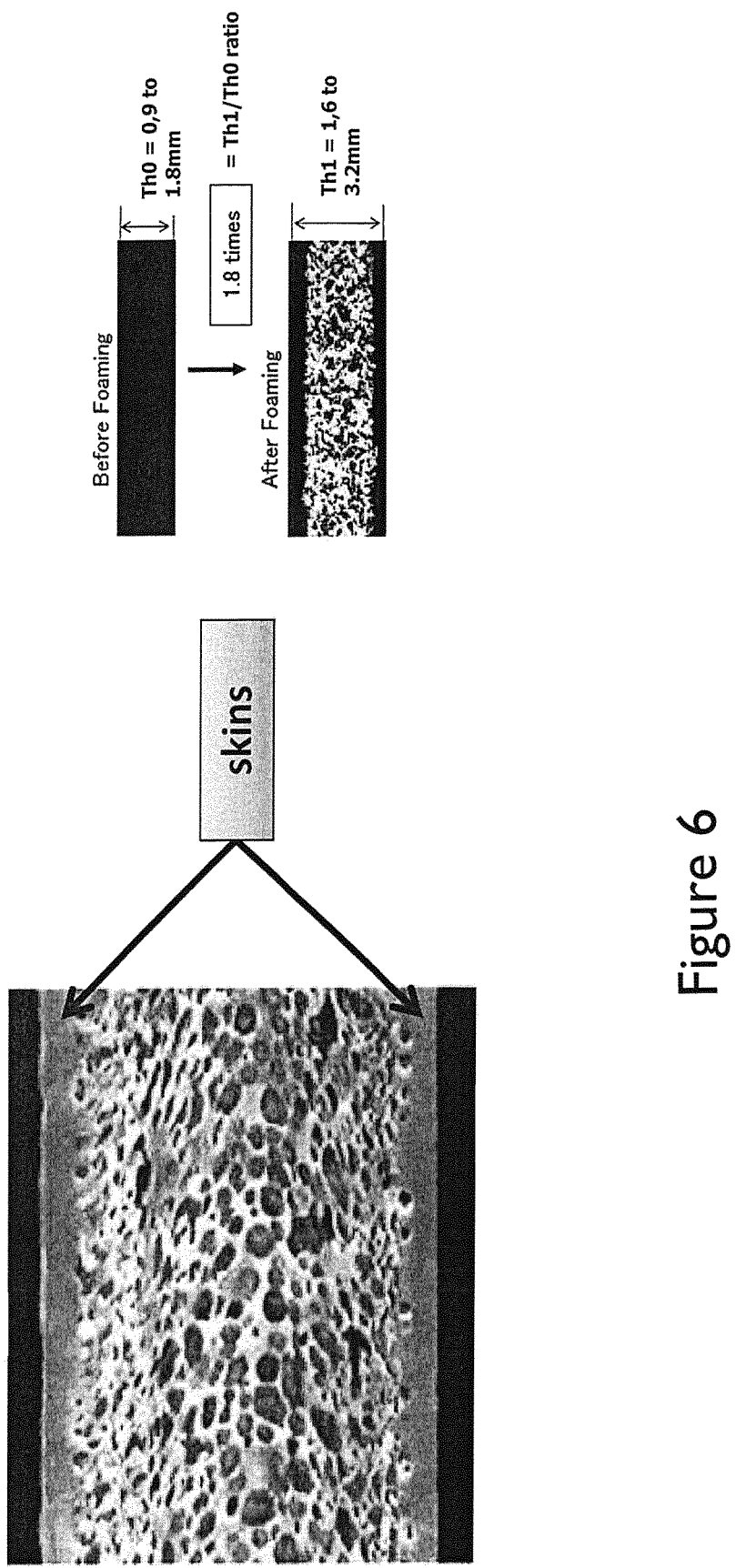
FIG. 6 illustrates an example of a section of a closure formed in accordance with the present invention.

FIGS. 5 and 6 illustrate some examples of foaming conducted in accordance with the present invention.

Figure 7:
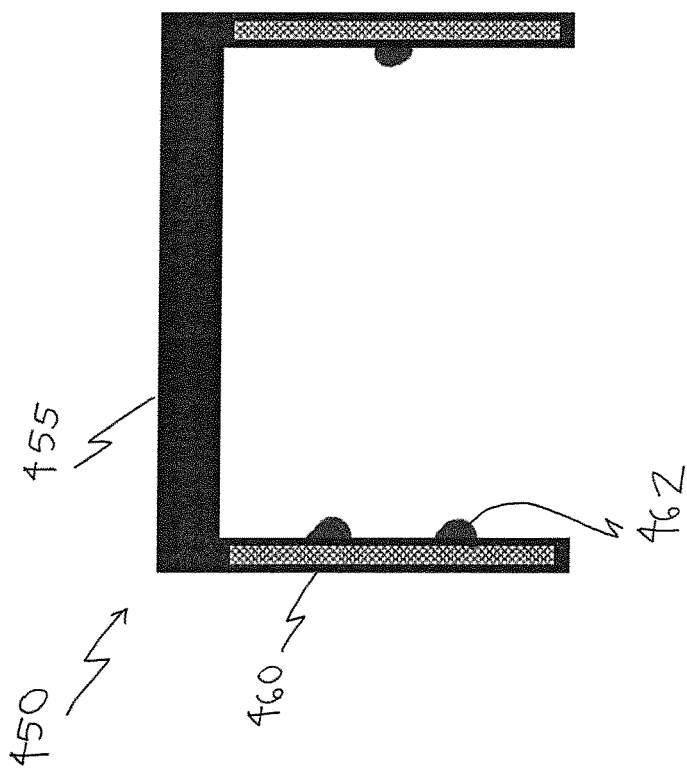

The closure 450 of FIG. 7 includes a disc-shape top plate 455 and a generally cylindrical sidewall 460 depending from the periphery of the plate 455. The sidewall 460 includes an internal screw thread formation 462. The sidewall (excluding the thickness of the formation) is thinner than the top plate. The top plate 455 is unfoamed and the sidewall 460 is expanded.

Figure 8:
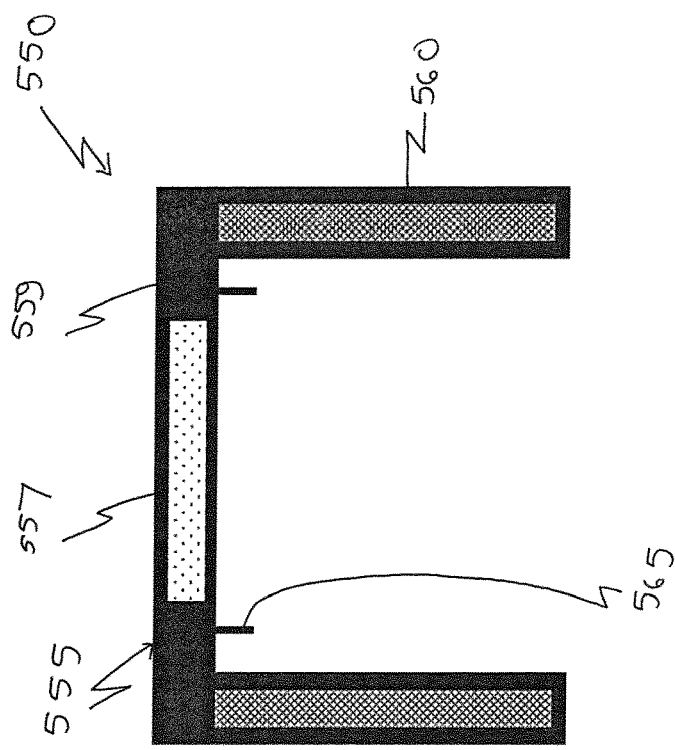
FIGS. 7 to 10 show closures formed in accordance with different embodiments of the present invention.

In FIG. 8 the closure 550 includes an expanded side wall 560. An annular plug seal 565 depends from the underside of the top plate 555. The top plate 555 includes a foamed core region 557 and an unfoamed region 559 (radially) outside of the core region 557. The seal 565 is located in the unfoamed region 559 so there is no foaming of the seal 565, which maintains dimensional repeatability and functional sealing performance.

Figure 9:
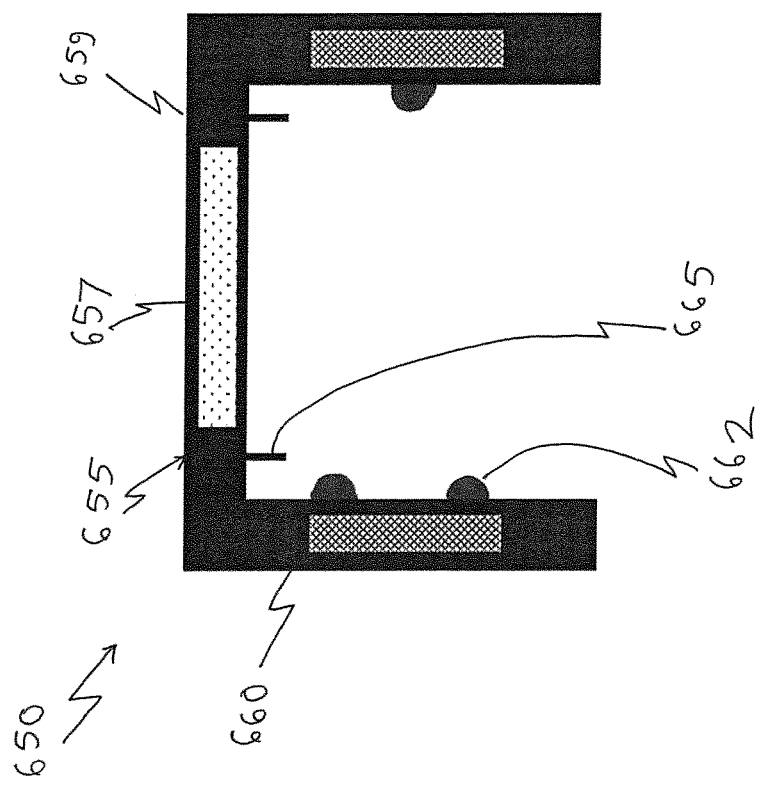

FIG. 9 shows a closure 650. Expanded material in the sidewall 660 is only in the region of the formation 662. The top plate 655 includes an unfoamed peripheral region 659 and a central region 657 with a foamed core. An annular seal 665 depends from the top plate in the region 659.

Figure 10:
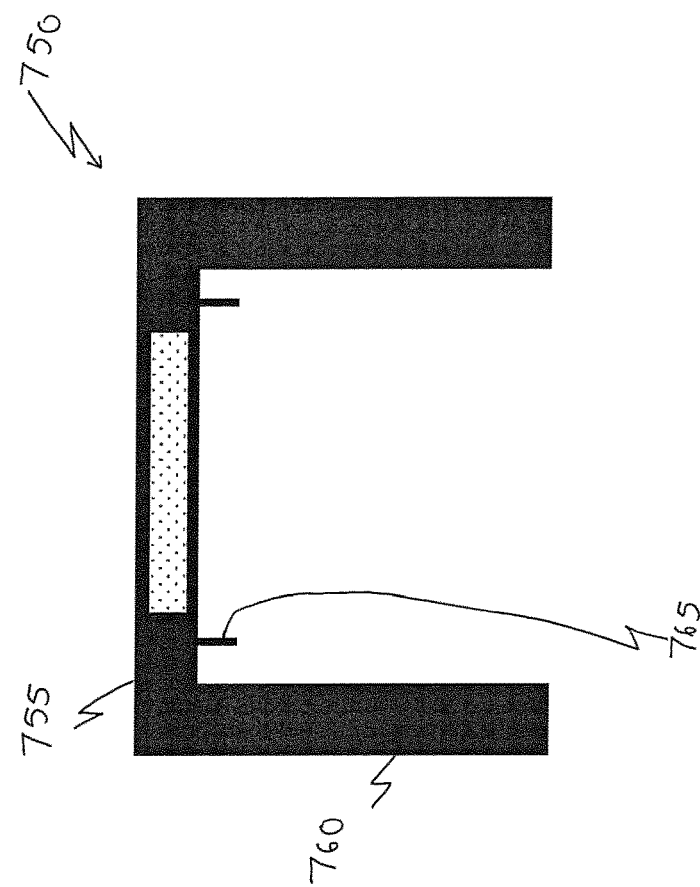

In FIG. 10 the closure 750 includes a top plate 755 with a foamed core within the boundary of a sealing member 765, and an unfoamed, unexpanded sidewall 760.

Figure 11:
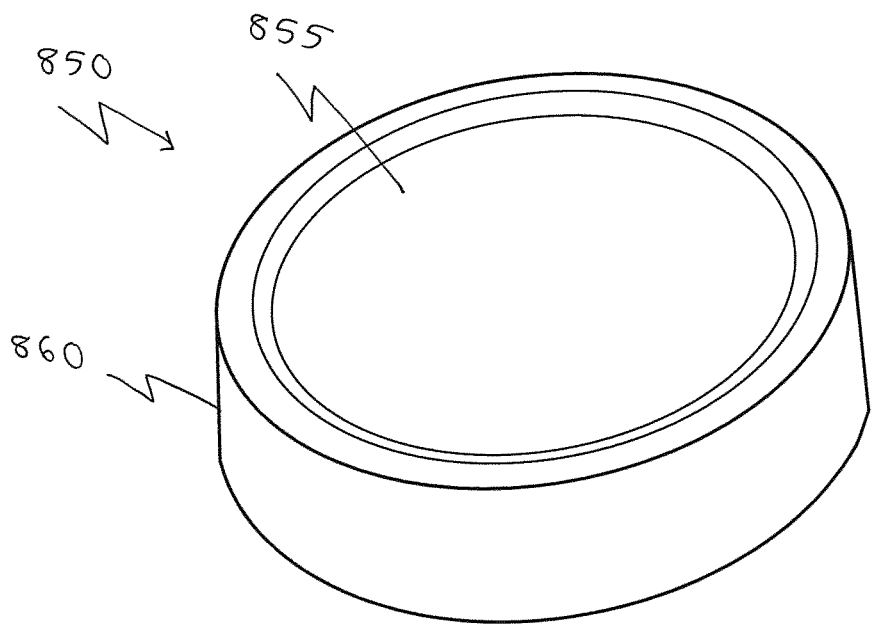
FIGS. 11 to 15 show a wide mouth closure formed in accordance with the present invention.
Figure 12:
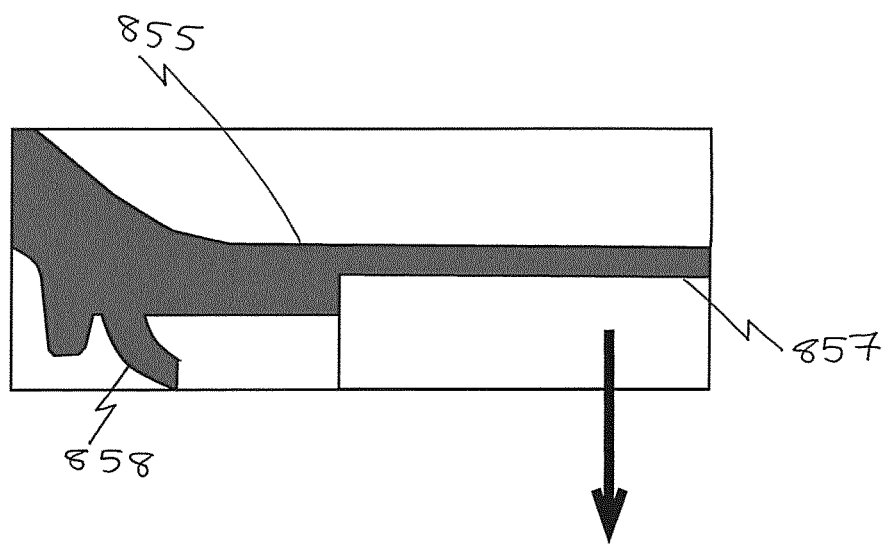

FIGS. 11 and 12 show a jar lid generally indicated 850. The lid 850 comprises a generally disc shape top plate 855 and a cylindrical sidewall 820. The top plate 855 includes a disc-shape central region 857 and an inclined, shoulder-like peripheral region 859 which merges into the sidewall 860.

The region 859 includes a sealing arrangement comprising an annular crab claw seal 858.

FIG. 12 shows the closure prior to foaming.

Figure 13:
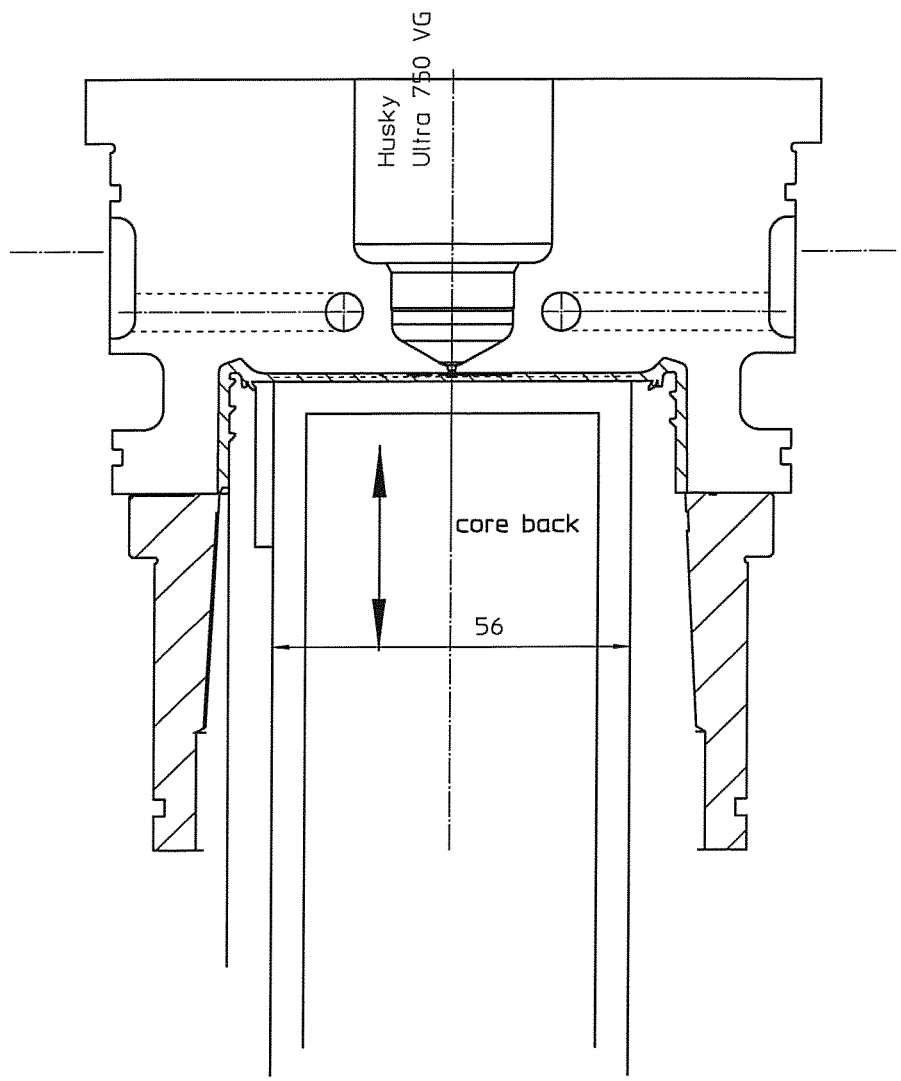

The closure is manufactured using a foamable plastics composition and by a core back process illustrated in FIG. 13, in which part of the core corresponding to the central region moves to cause foaming. Foaming is thereby restricted so as to be within only the central region and therefore spaced from the seal (which remains unfoamed).

Figure 14:
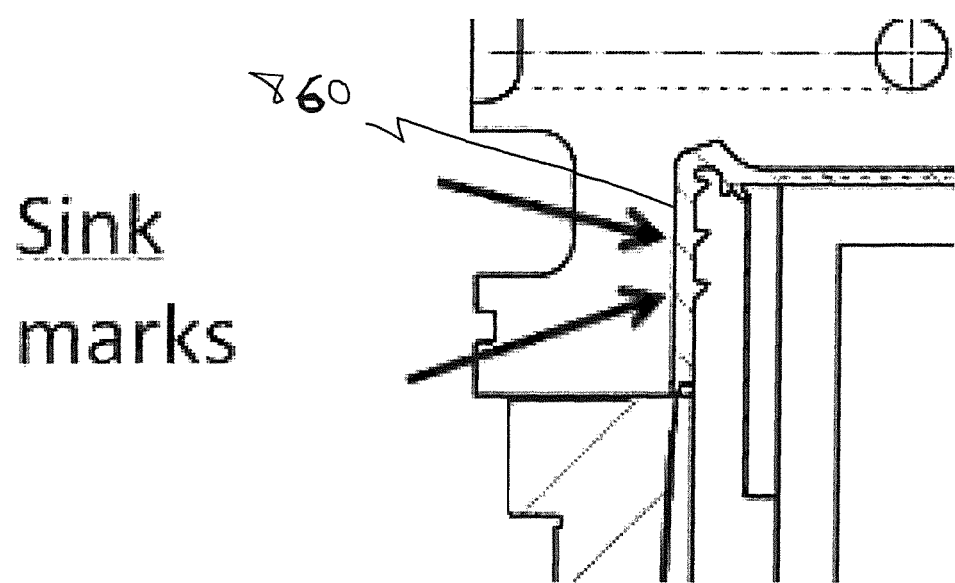

FIG. 14 shows part of a closure similar to the closure of FIGS. 11 to 13. In this embodiment the thickness of the sidewall 860 is reduced. Because the entire closure is formed from a formulation containing a foaming agent, the material which enters the part of the mould cavity corresponding to the sidewall expands, avoiding sink marks.

Figure 15:
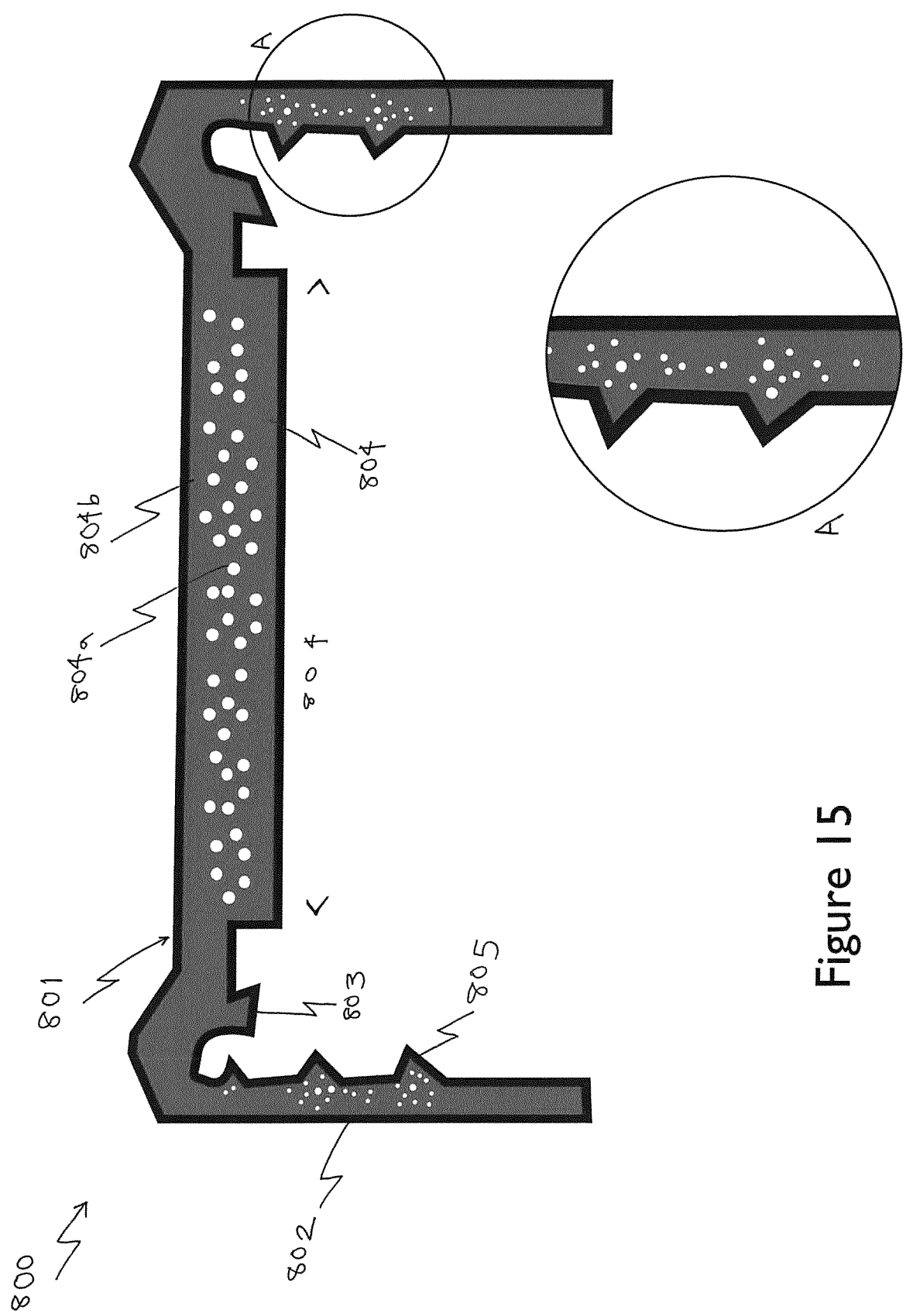

FIG. 15 shows a jar lid 800 formed according to a further embodiment. The lid 800 comprises a top plate 801 and a depending sidewall 802. An annular seal 803 depends from the top plate. A central region 804 of the top plate 801 is foamed (with a foamed core 804*a* sandwiched between outer skin layers 804*b*, 804*c*). The region 804 is inboard of the seal 803.

The sidewall 802 includes and internal screw thread formation 805. No specific foaming is induced in the sidewall. However, natural expansion of the inherently foamable material will compensate for any shrinkage in the area, in particular at the exterior of the sidewall adjacent the screw thread formation.

Figure 16:
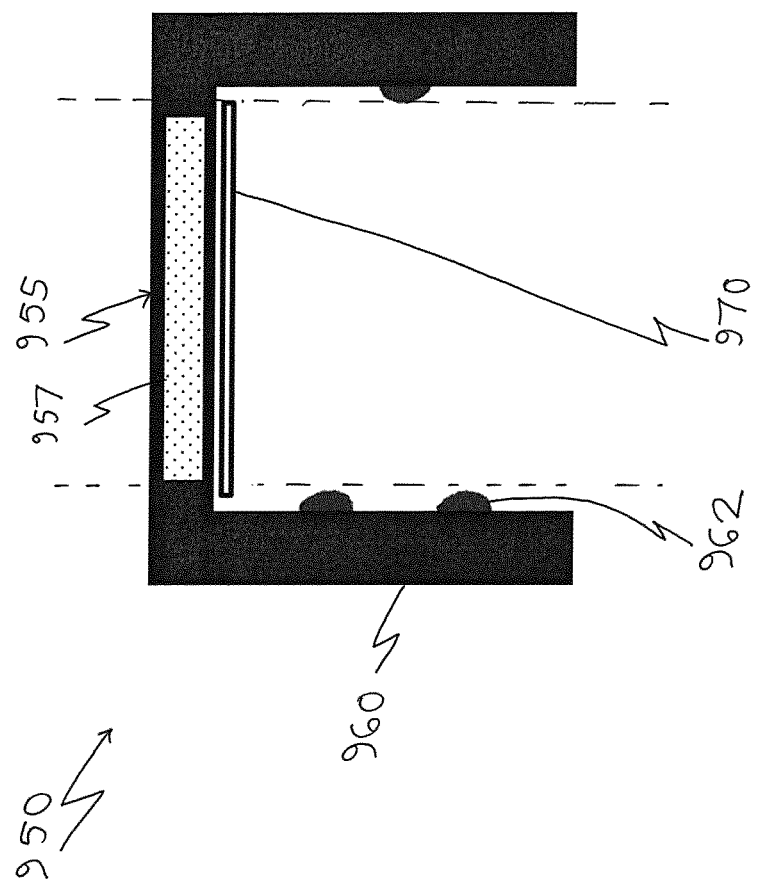
FIG. 16 shows a closure formed according to a further embodiment.

FIG. 16 shows a closure 950 formed according to a further embodiment. The closure includes a top plate 955 with a depending sidewall 960. The sidewall 960 includes a screw thread formation 962. A separate sealing liner 970 is provided and fits under the top plate 955. The top plate 955 has a foamed region 957. The foamed region is restricted to be within a boundary defined by the radial extent of the formation 962.

FIG. 17 shows a sequential moulding process in which there is an initial injection moulding phase to form a closure body 1070, followed by a foaming phase to form a body. Following the foaming phase a layer of material 1075 is moulded over the body. This would allow, for example, a cheaper material to be used for the initial body followed by a more expensive "finish" material.

Figure 18:
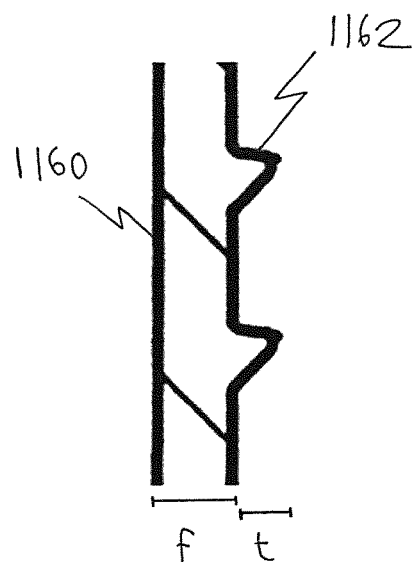

FIG. 18 shows a known closure sidewall 1160 with an internal screw thread formation 1162. Conventionally the thickness t of the screw thread is no greater than 80% of the thickness f of the sidewall if sink marks in the exterior face of the sidewall "behind" the thread are to be avoided.

Figure 19:
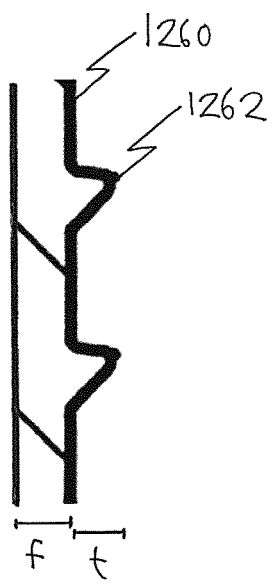

Referring to FIG. 19, the present inventors have found that the relative thickness of a thread 1262 can be significantly increased with respect to a sidewall 1260 (i.e. the thickness of the sidewall can be reduced) by using a foamable plastics material. During the moulding process the foamable material expands to naturally counteract material shrinkage in the mould which would otherwise form sink marks in the exterior face of the sidewall.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention.

What is claimed:

1. A closure comprising a top plate, a sidewall depending from the periphery of the top plate, and a sealing member formed integrally with said top plate and which depends from the top plate within the sidewall, in which the top plate comprises a foamed region and an unfoamed region, the unfoamed region radially outside the foamed region and the foamed region radially restricted to being within a boundary defined by the radial extent of the sealing member, and in which the sealing member is substantially unfoamed and forms an integral part of said unfoamed region of said top plate.

2. A closure as claimed in claim 1, in which the sealing member is a crab claw type seal or a plug seal.

3. A closure as claimed in claim 1, in which the sealing member is formed separately from, and is attachable to, the top plate.

4. A closure as claimed in claim 3, in which the sealing member is a liner, the liner being secured or securable to the top plate and defining a non-sealing region of the top plate within the liner, in which at least part of the non-sealing region includes the foamed region.

5. A closure as claimed in claim 1, in which the sealing member is generally annular.

6. A closure as claimed in claim 1, in which the extremity of the foamed region is spaced from the boundary defined by the sealing member by between 0.5 and 5 mm.

7. A closure as claimed in claim 1, in which the sidewall comprises a screw thread formation and in which the screw thread formation extends radially inwards and in which the foamed region does not extend beyond a boundary defined by the radial extent of the formation.

8. A closure as claimed in claim 1, wherein the unfoamed region has an apparent density of R, and the foamed region has an apparent density in the range of 0.2-0.9*R, the sidewall including a screw thread formation, the material forming the sidewall at least in the region of the formation having an apparent density in the range 0.8-0.99*R whereby shrinkage has been compensated by natural foaming.

9. A closure as claimed in claim 1, in which the sidewall is thinner than the top plate before foaming, after foaming, or before and after foaming.

10. A closure as claimed in claim 1, in which the thickness of the sidewall is down-gauged by 50% or by 20% to 80%.

11. A closure as claimed in claim 1, in which the sidewall comprises a screw thread formation, and in which the depth of the formation is more than 80% of the depth of the sidewall and is up to 120% of the depth of the sidewall.

12. A closure as claimed in claim 1, in which at least part of the sidewall has a foamed region.

13. A closure as claimed in claim 4, in which the liner is generally disc-shaped.

14. A closure as claimed in claim 6, in which the sealing member is generally annular.

15. A closure as claimed in claim 2, in which the sealing member is generally annular.

16. A closure as claimed in claim 3, in which the sealing member is generally annular.

17. A closure as claimed in claim 4, in which the sealing member is generally annular.

18. A closure as claimed in claim 1, in which the extremity of the foamed region is spaced from the boundary defined by the sealing member by between 1 mm and 2 mm.

* * * * *